United States Patent [19]

Chien

[11] Patent Number: 5,660,274

[45] Date of Patent: Aug. 26, 1997

[54] COMPACT DISC TRAY

[75] Inventor: Joseph Chien, Corona, Calif.

[73] Assignee: Ponica Industrial Co., Ltd., Corona, Calif.

[21] Appl. No.: 605,488

[22] Filed: Feb. 26, 1996

[51] Int. Cl.$^6$ .................................................. B65D 85/30
[52] U.S. Cl. ........................................ 206/308.1; 206/310
[58] Field of Search ............................. 206/307, 308.1, 206/309, 310

[56] References Cited

U.S. PATENT DOCUMENTS

| | | | |
|---|---|---|---|
| 4,702,369 | 10/1987 | Philosophe | 206/309 |
| 5,269,409 | 12/1993 | Brandt et al. | 206/310 |
| 5,284,242 | 2/1994 | Roth et al. | 206/309 |
| 5,377,827 | 1/1995 | Roth et al. | 206/309 |
| 5,417,324 | 5/1995 | Joyce et al. | 206/307 |
| 5,450,953 | 9/1995 | Reisman | 206/312 |
| 5,477,961 | 12/1995 | Taniyama | 206/308.1 |
| 5,494,156 | 2/1996 | Nies | 206/310 |

OTHER PUBLICATIONS

Photograph and specimen of a CD tray. Similar CD trays have been on sale more than one year prior to the filing date of this application.

*Primary Examiner*—Paul T. Sewell
*Assistant Examiner*—Nhan T. Lam
*Attorney, Agent, or Firm*—Danton K. Mak; Edward A. Brown; Sheldon & Mark, Inc.

[57] ABSTRACT

An improved tray (10) for compact discs (12) is provided herein. The tray (10) comprises a body member (16), a plurality of spaced-apart retainer tabs (20) and a plurality of stops (22). Each retainer tab (20) has a proximal end (72) attached to the body member (16), a distal end (74) extending away from the body member (16) which is capable of deflection between a relaxed position (76) and a deflected position (78) and a disc contact surface (80) for holding the disc (12) to the body member (16) by engagement with the disc (12) at the disc aperture (14) in the disc (12). The plurality of stops (22) prevent the retainer tabs (20) from overdeflecting during installation of the compact disc (12) onto the tray (10). Thus, the tray (10) can be made of clear, hard scratch-resistant plastic.

22 Claims, 2 Drawing Sheets

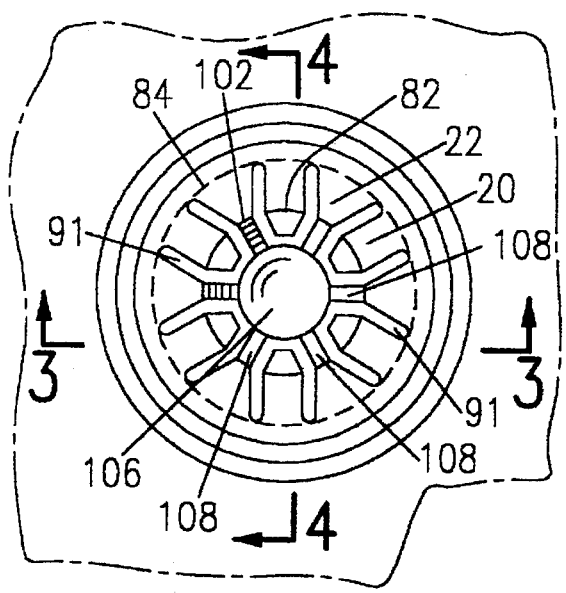
_fig.2_
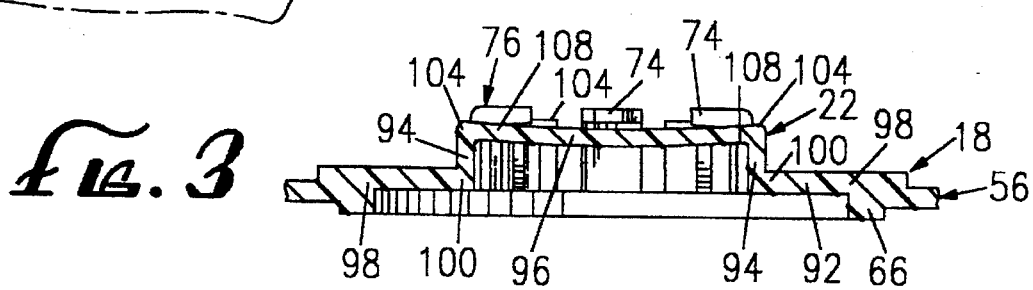
_fig.3_
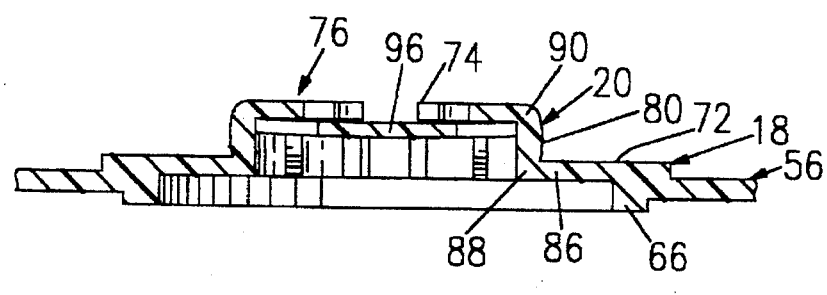
_fig.4_
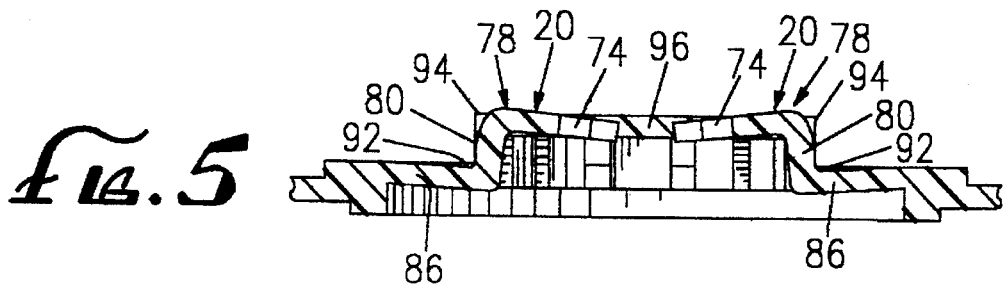
_fig.5_

COMPACT DISC TRAY

BACKGROUND

This invention is directed to an improved tray for retaining a disc and, in particular, an improved tray for retaining a compact disc.

Trays are commonly used to store and retain compact discs. These trays typically include a plurality of retainer tabs for retaining the compact disc by engagement with the disc at a circular disc aperture in the compact disc. The retaining tabs each have a proximal end attached to the tray in a circular pattern, a free distal end extending radially inward and upward from the circular pattern and a disc contact surface therebetween. The retainer tabs deflect to retain the disc by engagement of the disc contact surfaces with the disc at the disc aperture.

However, these trays are not entirely satisfactory because if the circular disc aperture is not properly aligned when installed onto the retainer tabs, some of the retainer tabs are subject to excessive deflection which can distort and/or break the retainer tabs.

One solution to the problem involves making the tray and retainer tabs from a soft and flexible plastic, such as polypropylene or polyethylene. However, these soft plastics do not always prevent the retainer tabs from distorting or breaking in the event of excessive deflection, are not available in a clear color and can scratch easily.

Thus, there is a need for a tray for a compact disc which has retainer tabs that are not subject to breaking upon installation of the compact disc, which is available in a clear color and which is resilient to scratching.

SUMMARY

The present invention is directed to a tray that meets this need, the tray being useful for retaining a disc, typically a compact disc having a substantially circular disc aperture with a diameter which is substantially equal to X. A tray according to the present invention comprises a body member, a plurality of spaced apart retainer tabs and at least one stop. The body member includes a retaining section. The retainer tabs and the stops are attached to the body member. As detailed below, the stops prevent the retainer tabs from overdeflecting during installation of the compact disc onto the tray. Thus, the tray can be made of a clear, hard, scratch-resistant plastic.

Each retainer tab has a proximal end attached to the retaining section, a distal end extending away from the body member which is capable of deflection between a relaxed position and a deflected position and a disc contact surface for holding the disc to the body member by engagement with the disc at the disc aperture. The proximal ends outline a proximal pattern which is substantially circular. The distal ends extend radially inward and upward from the proximal ends.

The retainer tabs are positioned so that the contact surfaces outline a contact pattern which is substantially circular when all of the distal ends are in the relaxed position and when all of the distal ends are in the deflected position. When all the distal ends are in the relaxed position, the contact pattern has a diameter which is larger than X and when all the distal ends are in the deflected position, the contact pattern has a diameter which is less than X.

The stop prevents at least one of the distal ends from deflecting farther than the deflected position when the disc is attached to the retainer tabs. Since the stop prevents the distal end from deflecting farther than the deflected position, the retainer tab is protected from breaking.

Preferably, the disc includes a plurality of stops which prevent the plurality of the retainer tabs from deflecting further than the deflected position when the disc is attached to the plurality of the retainer tabs to protect all of the retainer tabs from over deflection.

Since the retainer tabs are protected from over deflection, a clear, hard plastic can be used for the tray. Thus, the tray is stronger and more resilient to scratching.

DRAWINGS

These and other features, aspects and advantages of the present invention will become better understood from the following description, appended claims and accompanying drawings where:

FIG. 2 is a top plan view of a portion of the compact disc tray of FIG. 1 showing a retaining section, a plurality of retainer tabs and a plurality of stops;

FIG. 3 is a side section view of the portion of the compact disc tray of FIG. 2 taken on line 3—3 in FIG. 2;

FIG. 4 is a side section view of the portion of the compact disc tray of FIG. 2 taken on line 4—4 in FIG. 2, the retainer tabs shown in FIG. 4 are in the relaxed position; and FIG. 5 is a side section view of a portion of the compact disc tray of FIG. 2 taken on line 4—4 in FIG. 2, the retainer tabs shown in FIG. 5 are in the deflected position.

DESCRIPTION

Figure 1:
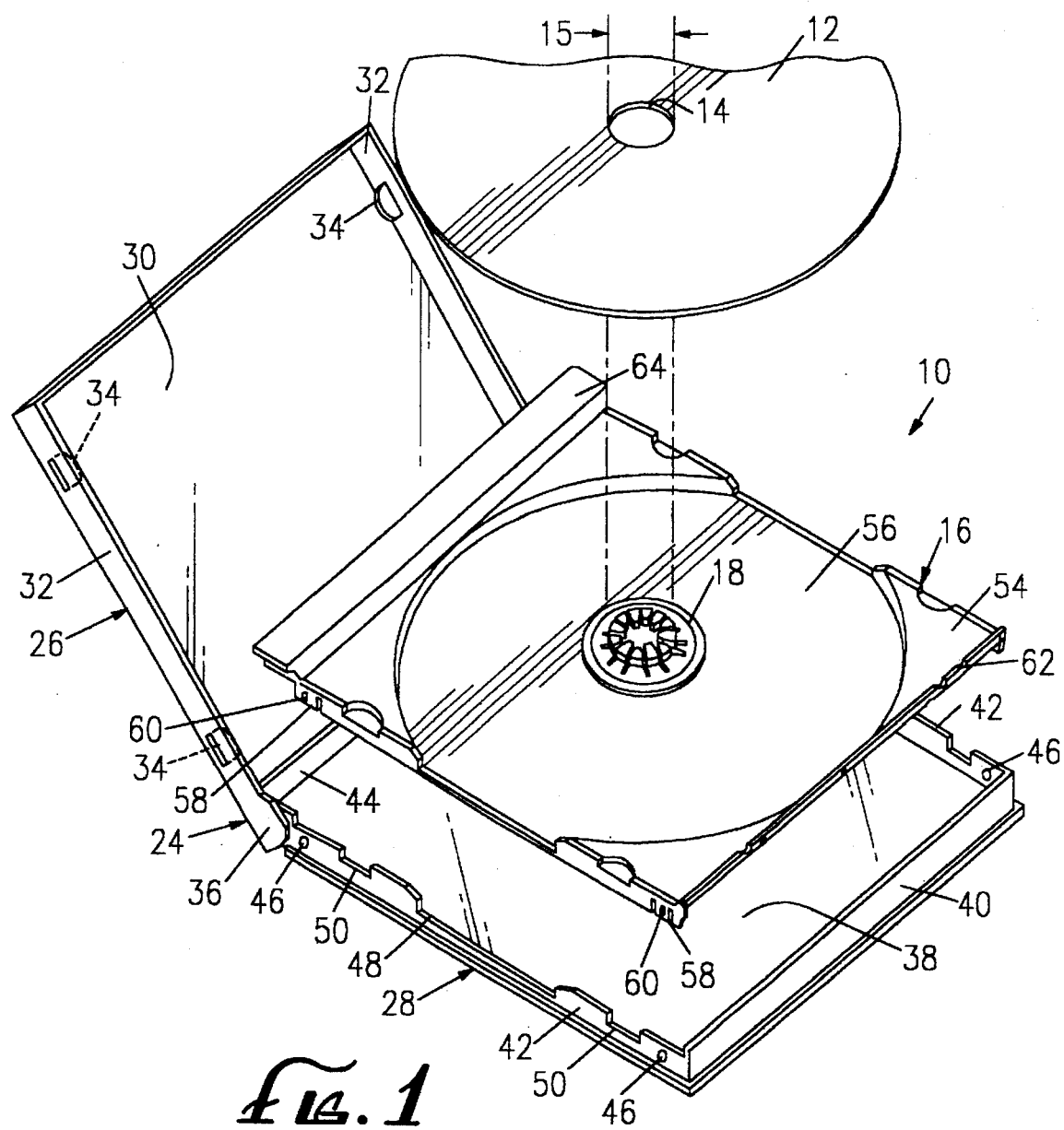
FIG. 1 is an exploded perspective view of a compact disc tray and portion of a compact disc having features of the present invention.

With reference to FIG. 1, the present invention is directed to an improved tray 10 for retaining a disc 12 having a substantially circular disc aperture 14 with a diameter 15 which is substantially equal to X. The improved tray 10 comprises (i) a body member 16 having a retaining section 18, (ii) a plurality of spaced apart retainer tabs 20, and (iii) a plurality of stops 22.

As shown in FIG. 1, the tray 10 retains a compact disc 12 having a circular disc aperture 14 with a diameter 15 which is equal to about 0.56 inches. Alternatively, the tray 10 can be used to retain a 33 rpm phonograph record (not shown) or other disc-shaped objects having a substantially circular disc aperture 14.

As shown in FIG. 1, the tray 10 also includes a hollow, rectangular-shaped container 24 which encircles and protects the disc 12 from damage when the disc 12 is not in use. The container 24 shown in FIG. 1 is commonly used for compact discs 12 and includes an upper portion 26 and a lower portion 28. The body member 16 inserts into and is retained by the lower portion 28 of the container 24. Alternatively, the body member 16 can be manufactured as an integral part of the lower portion 28 or the upper portion 26 or the body member 16 could be an integral part of a storage case (not shown) for compact discs or a compact disc storage stand (not shown).

In the embodiment shown in the Figures, the upper portion 26 includes a substantially flat top surface 30 and opposed upper side walls 32 which extend perpendicular to and downwardly from the top surface 30. Each upper side wall 32 includes a pair of tabs 34 extending inwardly from the upper side wall 32 and substantially parallel to the top surface 30 for retaining a card insert (not shown) displaying the contents of the container 24. Each upper side wall 32 also includes a cylindrical-shaped hinge projection (not shown) proximate a rearward edge 36 of the upper side wall 32 for hingedly connecting the upper portion 26 to the lower portion 28.

The lower portion 28 is sized and shaped to receive and retain the body member 16. The lower portion 28 is substantially open-box shaped and includes a substantially flat bottom surface 38, a front wall 40, opposed lower side walls 42 and a rearward wall 44 which extends perpendicular to and upwardly from the bottom surface 38. Each lower side wall 42 includes a plurality of apertures 46 for retaining the body member 16 to the lower portion 28 and a slot 48 for allowing a person to grasp the compact disc 12. Additionally, each lower side wall 42 includes a pair of tab slots 50 which provide clearance for the tabs 34 in the upper side walls 32 when the container 24 is closed. Each lower side wall 42 also includes a hinge aperture (not shown) proximate the rearward wall 44 for receiving one of the hinge projections for hingedly connecting the upper portion 26 to the lower portion 28.

As mentioned previously, in the embodiment shown in the Figures, the body member 16 is sized and shaped to fit within and be retained by the lower portion 28. The body member 16 shown in the Figures includes an outer perimeter 54 sized to fit within the lower portion ;28, a substantially flat disc section 56, and the retaining section 18.

The outer perimeter 54 is substantially rectangular and includes downwardly extending retention tabs 58 which include cylindrical-shaped pegs 60 for attaching the body member 16 to the apertures 46 in the lower portion 28. The outer perimeter 54 also includes an upwardly protruding lip 62 which abuts the front wall 40 of the lower portion 28 and a rearward step 64 which abuts the rearward wall 44 when the body member 16 is inserted into the lower portion 28.

The flat disc section 56 is a substantially cylindrical-shaped indentation from the outer perimeter 54 which is sized to receive the disc 12.

The retaining section 18 is typically located in a center 68 of the disc section 56 and is commonly slightly raised above the disc section 56 so that only a central portion of the disc 12 contacts the body member 16 and to allow space for the retainer tabs 20 to deflect. As shown in FIGS. 3 and 4, the retaining section 56 can include a downwardly projecting ring 66 which supports the retaining section 56 against the bottom surface 38 of the container 24 during installation of the disc 12 onto the retainer tabs 20.

In the embodiment shown in the Figures, the retainer tabs 20 and the stops 22 are attached to the retaining section 18. Typically, the body member 16, the retainer tabs 20 and the stops 22 are molded as an integral unit for ease of manufacturing and for structural stability. The body member 16, the retainer tabs 20 and the stops 22 can be made of a variety of materials which are flexible. For example, they can be made of hard plastics such as polystyrene, polycarbonate, and K Resin which are clear or scratch-resistant.

Each retainer tab 20 has a proximal end 72 attached to the retaining section 18, a distal end 74 extending away from the body member 16 capable of deflection between a relaxed position 76 and a deflected position 78 and a disc contact surface 80 for holding the disc 12 to the body member 16 by engagement with the disc 12 at the disc aperture 14. If the distal end 74 is deflected beyond the deflected position 78, the distal end 74 may not return to the relaxed position 76 or the retainer tab 20 may break.

The retainer tabs 20 are positioned so that the plurality of disc contact surfaces 80 outline a contact pattern 82 which is substantially circular when all of the distal ends 74 are in the relaxed position 76 and when all of the distal ends 74 are in the deflected position 78. When all the distal ends 74 are in the relaxed position 76, the contact pattern 82 has a diameter which is larger than X and when all the distal ends 74 are in the deflected position 78, the contact pattern 82 has a diameter which is less than X.

The proximal end 72 of each of the retainer tabs 20 are positioned to outline a proximal pattern 84 which is circular. Each of the retainer tabs 20 extends radially outward and upward from the proximal end 72. Each of the retainer tabs 20 includes a deflecting section 86 which extends radially inward from the proximal end 72 and substantially parallel to the retaining section 18.

The disc contact surface 80 extends upward and substantially perpendicular to the deflecting section 86 from a deflecting end 88 of the deflecting section 86. As shown in FIG. 4, the disc contact surface 80 is slightly convex shaped to facilitate the installation of the disc 12 onto the tray 10.

The distal ends 74 each extend away from an upper end 90 of the disc contact surface 80. In the embodiments shown in FIG. 4, each distal end 74 extends radially inward from the disc contact surface 80 and substantially perpendicular to the disc contact surface 80.

At least one stop 22 prevents at least one of the distal ends 74 from deflecting farther than the deflected position 78 when the disc 12 is attached to the plurality of retainer tabs 20. Preferably, the tray 10 includes a plurality of stops 22 which prevent all of the distal ends 74 from deflecting farther than the deflected position 78 when the disc 12 is attached to the plurality of retainer tabs 20 so that all of the retainer tabs 20 are protected.

In the embodiment shown in FIGS. 2 and 3, each stop 22 is attached to the retaining section 18 and is disposed between a pair of adjacent retainer tabs 20 for preventing the distal ends 74 from deflecting farther than the deflected position 78. Each stop 22 can include a lower section 92, a transverse section 94 and a support section 96. As shown in FIG. 2, gaps 91 are present between the stops 22 and the retainer tabs 20 to allow the retainer tabs 20 to deflect between the relaxed position 76 and the deflected position 78.

The lower section 92 has a first end 98 attached to the retaining section 18 on the outline of the proximal pattern 84, between adjacent retainer tabs 20 and an opposed second end 100 which extends radially inward from the first end 98 and substantially parallel with the retaining section 18.

The transverse section 94 attaches to the second end 100 and extends upwardly, substantially perpendicular to the retaining section 18. The plurality of transverse sections 94 outline a transverse pattern 102 which is substantially circular. The transverse pattern 102 has a diameter which is less than X and greater than the diameter of contact pattern 82 when all of the distal ends 74 are in the deflected position 78.

The support section 96 is attached proximate to an upper end 104 of each of the transverse sections 94 to support the transverse sections 94 and inhibit the transverse sections 94 from deflecting when the disc 12 is attached to the plurality of retainer tabs 20. Alternately, the support section 96 can be attached below the upper end 104 of each of the transverse sections 94. In the embodiment shown in the Figures, the support section 96 interconnects all of the upper ends 104 of the transverse sections 94 so that all the transverse sections 94 must bend before any deflection occurs in the stops 22. As shown in FIG. 2, the support section 96 comprises a circular center section 106 having spokes 108 which extend radially from the center section 106 to attach the upper ends 104 of the transverse sections 94 and support the stops 22. The space between the spokes 108 and the retainer tabs 20 form the gaps 91 between the stops 22 and the retainer tabs 20.

With reference to FIGS. 3 and 5, the support section 96 is slightly concave so that the support section 96 corresponds to the positioning of the distal ends 74 in the deflected position 78 to prevent the distal ends 74 from deflecting farther than the deflected position 78 when the disc 12 is attached to the plurality of retainer tabs 20.

Depending upon the misalignment of the disc 12, the transverse section 94 and/or the support section 96 prevent the distal ends 74 from overdeflecting upon installation of the disc 12. For example, if the misalignment of the disc 12 is directed towards the disc contact surface 80, the transverse section 94 prevents the retainer tabs 20 from overdeflecting when the disc 12 is attached to the plurality of retainer tabs 20. Alternately, if the misalignment of the disc 12 is directed towards the distal ends 74, the support section 96 prevents the retainer tabs 20 from overdeflecting.

With reference to FIG. 1, the compact disc 12 is installed onto the tray 10 by aligning the compact disc aperture 14 with the plurality of retainer tabs 20. The disc 12 is then pressed downwardly. The retainer tabs 20 deflect to retain the disc 12 by engagement of the disc contact surfaces 80 with the disc 12 at the disc aperture 14. The transverse sections 94 align the disc 12 onto the retainer tabs 20 and prevent the retainer tabs 20 from overdeflecting. Since the stops 22 prevent the retainer tabs 20 from overdeflecting during installation of the compact disc 12 onto the tray 10, the tray 10 can be made of a clear, hard, scratch-resistant plastic. Further, the body member 16 can be molded directly into the upper portion 26 or the lower portion 28 of the container 24 since the body member 16 can be made from a clear, scratch-resistant material.

While the present invention is described in considerable detail with reference to certain preferred versions, other versions are possible. For example, the stops 22 could be formed as an integral part of the lower portion 28 instead of the retaining section 18. Therefore, the spirit and scope of the appended claims should not be limited to the description of the preferred versions contained herein.

What is claimed is:

1. A tray for retaining a disc having a substantially circular disc aperture with a diameter which is substantially equal to X, the tray comprising:
    (a) a body member sized to receive the compact disc;
    (b) a plurality of spaced apart retainer tabs, each retainer tab having (i) a proximal end attached to the body member, (ii) a distal end extending away from the body member which is capable of deflecting between a relaxed position and a deflected position, and (iii) a disc contact surface for holding the disc to the body member by engagement with the disc at the disc aperture;
    (c) a plurality of stops attached to the body member for preventing the distal ends from deflecting farther than the deflected position when the disc is attached to the plurality of retainer tabs, each stop comprising (i) a lower section having a first end attached between adjacent retainer tabs and an opposed second end which extends radially inward from the first end, (ii) a transverse section attached to the second end which extends substantially perpendicular to the retaining section, and (iii) a support section attached proximate an upper end of each of the transverse sections, the support sections each having an upper surface and a lower surface which are disposed above the lower sections.

2. The tray of claim 1 wherein (i) the retainer tabs are positioned so that the contact surfaces outline a contact pattern which is substantially circular, (ii) when all of the distal ends are in the relaxed position, the contact pattern has a diameter which is larger than X, (iii) when all of the distal ends are in the deflected position, the contact pattern has a diameter which is less than X.

3. The tray of claim 1 wherein the plurality of proximal ends are positioned to outline a proximal pattern which is circular and the retaining tabs extend radially inward and upward from the proximal pattern.

4. The tray of claim 3 wherein the first end of the lower section of each of the stops are attached proximate the outline of the proximal pattern between adjacent retainer tabs, and the transverse sections prevent the distal ends from deflecting farther than the deflected position when the disc is attached to the plurality of retainer tabs.

5. The tray of claim 4 wherein the plurality of transverse sections outline a transverse pattern which is circular and has a diameter which is (i) less than X and (ii) greater than the diameter of the contact pattern when all of the distal ends are in the deflected position.

6. The tray of claim 3 wherein the first end of the lower section of each of the stops are attached proximate to the outline of the proximal pattern between adjacent retainer tabs, and the support sections prevent the distal ends from deflecting farther than the deflected position when the disc is attached to the plurality of retainer tabs.

7. The tray of claim 1 wherein (i) the plurality of proximal ends are positioned to outline a proximal pattern which is circular, (ii) each retainer tab includes a deflecting section which extends radially inward from the proximal end and substantially parallel to the body member, and (iii) the disc contact surface extends substantially upward and perpendicular to the body member from a deflecting end of the deflecting section.

8. The tray of claim 1 wherein each stop is disposed between a pair of adjacent retainer tabs for preventing the distal ends from deflecting farther than the deflected position when the disc is attached to the plurality of retainer tabs.

9. The tray of claim 1 comprising a compact disc having a substantially circular disc aperture with a diameter which is substantially equal to X attached thereto.

10. The tray of claim 1 wherein the support sections include a center section having spokes which extend radially outward from the center section to attach the upper ends of the transverse sections, the center section having an upper surface and a lower surface which are disposed above the lower sections of the stops.

11. The tray of claim 10 wherein the center section is circular shaped and is disposed below the distal ends of the retainer tabs.

12. A tray for retaining a disc having a substantially circular disc aperture with a diameter which is substantially equal to X, the tray comprising:
    (a) a body member sized to receive the compact disc, the body member having a retaining section;
    (b) a plurality of spaced apart retainer tabs each retainer tab having (i) a proximal end attached to the retaining section, (ii) a distal end extending away from the retaining section which is capable of deflecting between a relaxed position and a deflected position, and (iii) a disc contact surface for holding the disc to the body member by engagement with the disc at the disc aperture;

wherein, the retainer tabs are positioned so that the contact surfaces outline a contact pattern which is substantially circular;

wherein, when all of the distal ends are in the relaxed position, the contact pattern has a diameter which is larger than X and when all of the distal ends are in the deflected position, the contact pattern has a diameter which is less than X; and (c) a plurality of stops attached to the retaining section for preventing the distal ends from deflecting farther than the deflected position when the disc is attached to the plurality of retainer tabs, each stop comprising (i) a lower section having a first end attached between adjacent retainer tabs and an opposed second end which extends radially inward from the first end, (ii) a transverse section attached to the second end which extends substantially perpendicular to the retaining section, and (iii) a support section attached proximate an upper end of each of the transverse sections, the support sections each having an upper surface and a lower surface which are disposed above the lower sections.

13. The tray of claim 12 wherein the plurality of proximal ends are positioned to outline a proximal pattern which is circular and the distal ends extend radially inward and upward from the proximal pattern.

14. The tray of claim 13 wherein the first end of the lower section of each of the stops are attached in the proximal pattern between adjacent retainer tabs, and the transverse sections prevent the distal ends from deflecting farther than the deflected position when the disc is attached to the plurality of retainer tabs.

15. The tray of claim 14 wherein the plurality of transverse sections are disposed in a transverse pattern which is circular and has a diameter which is (i) less than X and (ii) greater than the diameter of the contact pattern when all of the distal ends are in the deflected position.

16. The tray of claim 12 wherein (i) the plurality of proximal ends are positioned to outline a proximal pattern which is circular, (ii) each retainer tab includes a deflecting section which extends radially inward from the proximal end and substantially parallel to the retaining section, and (iii) the contact surface extends substantially upward and perpendicular to the retaining section from a deflecting end of the deflection section.

17. The tray of claim 12 comprising a compact disc having a substantially circular disc aperture with a diameter which is substantially equal to X attached thereto.

18. The tray of claim 12 wherein the support sections include a center section having spokes which extend radially outward from the center section to attach the upper ends of the transverse sections, the center section having an upper surface and a lower surface which are disposed above the lower sections of the stops.

19. The tray of claim 18 wherein the center section is circular shaped and is disposed below the distal ends of the retainer tabs.

20. A tray for retaining a disc having a substantially circular disc aperture with a diameter which is substantially equal to X, the tray comprising:

(a) a body member sized to receive the compact disc, the body member having a retaining section;

(b) a plurality of spaced apart retainer tabs, each retainer tab having (i) a proximal end attached to the retaining section, the plurality of proximal ends are positioned to outline a proximal pattern which is circular, (ii) a distal end extending radially inward from the proximal pattern which is capable of deflecting between a relaxed position and a deflected position, and (iii) a disc contact surface for holding the disc to the body member by engagement with the disc at the disc aperture;

wherein, the retainer tabs are positioned so that the contact surfaces outline a contact pattern which is substantially circular;

wherein, when all of the distal ends are in the relaxed position, the contact pattern has a diameter which is larger than X and when all of the distal ends are in the deflected position, the contact pattern has a diameter which is less than X; and (c) a plurality of stops attached to the retaining section for preventing the distal ends from deflecting farther than the deflected position when the disc is attached to the plurality of retainer tabs, each stop comprising (i) a lower section having a first end attached in the proximal pattern between adjacent retainer tabs and an opposed second end which extends radially inward from the first end, and (ii) a transverse section attached to the second end which extend substantially perpendicular to the retaining section, and (iii) a support section attached proximate an upper end of each of the transverse sections to support the transverse sections, the support sections include a center section having spokes which extend radially outward from the center section to attach the upper ends of the transverse sections, the center section having an upper surface and a lower surface which are disposed above the lower sections of the stops, the center section being disposed below the distal ends.

21. The tray of claim 20 wherein the plurality of transverse sections are disposed in a transverse pattern which is circular and has a diameter which is (i) less than X and (ii) greater than the diameter of the contact pattern when all of the distal ends are in the deflected position.

22. The tray of claim 20 comprising a compact disc having a substantially circular disc aperture with a diameter which is substantially equal to X attached thereto.

* * * * *